United States Patent
Krysiak et al.

(10) Patent No.: US 6,745,513 B2
(45) Date of Patent: Jun. 8, 2004

(54) AGGLOMERATED MULCH CARRIER

(75) Inventors: Michael D. Krysiak, Green Bay, WI (US); Bryan A. Fish, Green Bay, WI (US); Daniel P. Madigan, Green Bay, WI (US); Pat Phillips, Green Bay, WI (US)

(73) Assignee: Encap, LLC., Green Bay, WI (US)

(*) Notice: Subject to any disclaimer, the term of this patent is extended or adjusted under 35 U.S.C. 154(b) by 0 days.

(21) Appl. No.: 09/821,128

(22) Filed: Mar. 29, 2001

(65) Prior Publication Data

US 2001/0013198 A1 Aug. 16, 2001

Related U.S. Application Data

(63) Continuation-in-part of application No. 09/544,878, filed on Apr. 17, 2000, which is a continuation-in-part of application No. 09/510,782, filed on Feb. 23, 2000, which is a continuation-in-part of application No. 09/113,254, filed on Jul. 10, 1998, now Pat. No. 6,209,259.

(51) Int. Cl.$^7$ ................................................. A01G 7/00
(52) U.S. Cl. ............................................................ 47/9
(58) Field of Search ............................................... 47/9

(56) References Cited

U.S. PATENT DOCUMENTS

| | | |
|---|---|---|
| 56,140 A | 7/1866 | Blessing |
| 2,664,350 A | 12/1953 | Hale et al. |
| 3,269,824 A | 8/1966 | Aswell |
| 3,545,129 A | 12/1970 | Schreiber et al. |
| 3,621,612 A | 11/1971 | Porter |
| 3,698,133 A | 10/1972 | Schreiber |
| 3,905,152 A | 9/1975 | Loperfido |
| 3,936,976 A | 2/1976 | Porter et al. |
| 3,947,996 A | 4/1976 | Watts |
| 3,950,891 A | 4/1976 | Hinkes |
| 4,065,287 A | 12/1977 | Roth |
| 4,116,666 A | 9/1978 | Willard, Sr. |
| 4,192,095 A | 3/1980 | Haslam et al. |
| 4,272,417 A | 6/1981 | Barke et al. |
| 4,344,979 A | 8/1982 | Gago et al. |
| 4,369,597 A | 1/1983 | Leep et al. |
| 4,438,593 A | 3/1984 | McNew et al. |
| 4,452,008 A | 6/1984 | Sandhu et al. |
| 4,493,162 A | 1/1985 | Langan et al. |
| 4,539,038 A | 9/1985 | Gombert |
| 4,628,633 A | 12/1986 | Nilsson |
| 4,752,319 A | 6/1988 | DelliColli |
| 4,759,151 A | 7/1988 | Gerber |
| 5,044,116 A | 9/1991 | Gago et al. |
| 5,087,475 A | 2/1992 | Bazin et al. |
| 5,106,648 A | 4/1992 | Williams |
| 5,127,185 A | 7/1992 | Kojimoto et al. |
| 5,300,127 A | 4/1994 | Williams |
| 5,368,626 A | 11/1994 | Schnuda |
| 5,525,131 A | 6/1996 | Asano |
| 5,623,781 A | 4/1997 | Legro |
| 5,627,133 A | 5/1997 | Nelson |
| 5,647,951 A | 7/1997 | Bayer |
| 5,802,763 A | 9/1998 | Milstein |
| 5,806,445 A | 9/1998 | Decker |
| 5,916,027 A | 6/1999 | Spittle |
| 5,942,029 A | 8/1999 | Spittle |
| 6,029,395 A | 2/2000 | Morgan |

OTHER PUBLICATIONS

Pietsch, Wolfgang, Part 2. Agglomerate Bonding and Strength, Date unknown (reprinted form W. Pietsch (98).

Staub–Reinhalt, Luf, Part 3, The Agglomerate Behavior of Fine Particles, (Reprinted from W. Pietsch (7), English edition), vol. 27, Jan. 1967.

Briquetting, palletizing, extrusion & fluid bed/spray granulation, table of contents, table 8–52.

Perry Chemical Engineers Handbook, 8–61.

Briquetting, palletizing, Exrusion and Flud Bed/Spray Granulation, Engelleitner, tables 23–24, p. 21 and 23.

*Primary Examiner*—Peter M. Poon
*Assistant Examiner*—Andrea M. Valenti
(74) *Attorney, Agent, or Firm*—Philip M. Weiss; Weiss & Weiss

(57) ABSTRACT

The present invention relates to the use of an agglomerated/granulated mulch product as a seed carrier that is produced by an agglomeration technology. The mulch agglomerates used as a carrier for the seeds reduces segregation (unmixing) tendencies of seeds from the carrier product.

19 Claims, No Drawings

AGGLOMERATED MULCH CARRIER

RELATED PATENT APPLICATIONS

The application is a continuation-in-part of Ser. No. 09/544,878 filed Apr. 17, 2000, which is a continuation-in-part of U.S. patent application Ser. No. 09/113,254 filed Jul. 10, 1998 now U.S. Pat. No. 6,209,259. The application is a continuation-in-part of Ser. No. 09/510,782 filed Feb. 23, 2000.

FIELD OF THE INVENTION

The present invention relates to the use of an agglomerated/granulated mulch product as a seed carrier that is produced by an agglomeration technology. The mulch agglomerates, used as the carrier for the seeds, reduces segregation (unmixing) tendencies of seeds from the carrier product.

BACKGROUND OF THE INVENTION

It is known in the art to mix a carrier such as sand with seeds that are hard to distribute because the carrier adds volume and aids in even distribution of the seeds. Typical seeds that are aided in the use of a carrier include wildflower, flower, grass, and other various horticultural/agricultural seeds.

In a typical seeding practice most seeds are sowed by hand, with a rotary spreader, a drop-type spreader, hydro mulching, or pressure/compaction agglomerated mulch, or other non-agglomerated mulch.

Because most seed mixes contain seeds of vastly different sizes and are often difficult to broadcast, it is suggested to blend an inert carrier such as fine dry sand with the seed to insure even distribution. A ratio of 2:1 up to 10:1 (carrier to seed ratio) is usually recommended. Carriers help in hand broadcasting the seeds and are also helpful in distributing the seed uniformly, especially over areas greater than 20 sq. ft.

Hydroseeding is another form of a carrier. Hydroseeding is the application of a slurry of seed and water to soil. The slurry may also contain mulch (hydromulching), a tackifier and fertilizer. Mulches are made of weed fiber, paper or excelsior, and their purpose is to hold seeds in place, help retain moisture, and provide protection from erosion.

It is a well known fact that segregation/separation of particles can occur when blending different particles together.

Mulches are commonly applied over grass seed beds. Mulches help to increase seed germination and decrease soil erosion allowing seeds to become firmly established in the seeded area. Mulches typically consist of straw, wood shavings, or paper. In the prior art, mulches are mixed with water and agitated in a holding tank, and then sprayed onto a seed bed. Some mulches are woven into blankets that are designed to be laid down over seed beds. Some mulches are chemically bonded natural fiber spray-applied mulches. These mulches use a vegetable gum binder such as guar gum to bind together natural fibers.

Most mulches are loose configurations of unbonded fibers that easily wash away. Paper-based mulches tend to bond into a paper mache-like mat that inhibits oxygen and sunlight transfer, and the ability of seedlings to emerge through the mulch, affecting vegetation establishment. Chemically-bonded mulch forms an almost impenetrable layer over the seed bed that is poor at passing oxygen and water through to the seed bed.

Horticultural/Agricultural growers, gardeners, landscape operators, flower growers, and the like produce a wide variety of cultivated plants. Many such crops are grown from seed. The sizes, shapes, and physical characteristics of the various kinds of seeds are as varied as the number of crops produced therefrom.

Producers of such cultivated crops encounter a variety of challenges in handling and distributing such seed, as well as with sowing of such seed in suitable growing media. Certain seed may desirably be sowed by a broadcast method if the seed were compatible with broadcast application.

Another difficulty encountered in sowing seed is that the seed may be so small as to be difficult to handle, thereby to place properly-spaced seeds at a desired spacing as to make cost-effective use of the seed, thereby to produce a crop of the related plants without using any more seed than necessary, thus to gain maximum benefit from the amount of seed used.

While small seed may be efficiently handled by industrial equipment especially designed for handling such seed, typically the user of such seed also handles various other types of seed; and may be unable to justify the cost of such specialty seed-handling equipment. Rather, the seed user typically has a limited range of seed handling equipment which must be capable of being used and/or adapted to handle and apply all the types of seeds being used by that user. Where the seed itself can be adapted to the equipment, specialty seed can be handled without need for any specialized equipment.

Even where the seed may be sown by hand, such as seedling or bedding trays or pots, some seeds are so small as to be difficult for the sower/user to effectively manipulate and control by hand. Typical of such difficult to handle seeds are seeds of lettuce, carrots, the cabbage family, ground cherries, and alfalfa. Many flower seeds are equally small and/or difficult to handle and/or manipulate, for example poppy seed.

SUMMARY OF THE INVENTION

The present invention relates to a mulch product, comprised of mulch agglomerates wherein the mulch agglomerates are produced by an agglomeration process. The agglomeration process uses a tumble/agitative agglomeration technology; wherein the mulch product is a carrier for seeds. It is an object of the present invention for the tumble/agitative agglomeration technology to comprises i.e., tumbling, mixing, granulation, pelletizing, balling, or conditioning. This technology includes using either a mixer, balling drum/pan, and/or fluidized bed method. It is an object of the present invention for the mixer to be a double cone, twin shell turbine, drum ribbon, vertical screw in cone, paddle, plow countercurrent, pin, multiple cone, vertical plow, falling curtain drum and/or muller. It is an object of the present invention for the agglomeration process to use indurance technology.

It is an object of the present invention for the agglomeration process to use pressure agglomeration technology (i.e. briquetting, compacting, molding, tabletting, isostatic pressing), wherein the agglomeration technology uses non-extrusion, non-pelleting method such as piston presses for tabletting and/or roller presses for briquetting. It is an object of the present invention wherein the agglomeration technology uses agglomeration by heat, spray solidification, direct capillary action and/or coating techniques.

It is an object of the present invention for the mulch to comprise a material comprising a fiber cellulose, clay, loam, sand, and/or a combination of same. It is an object of the present invention for the mulch product to comprise macronutrients and/or micronutrients. It is an object of the present invention for the mulch product to further comprise a binding agent.

The present invention relates to a mulch product comprising agglomerates. The agglomerates are small enough to resist segregation, and are assymetrical and possess interlocking properties. It is an object of the invention for the agglomerates to have a non-smooth surface. It is an object of the invention for the agglomerates to possess a light bulky density.

The present invention relates to the use of an agglomerated/granulated mulch product as a seed carrier that is produced by either a tumble/agitative, induration, or pressure agglomeration technology. The term agglomeration relates to particle size enlargement theory. An agglomerate is defined as an assemblage of particles, which is either loosely or rigidly joined together. Several particles adhering to each other. It is a further object of the present invention to add a fertilizer, colorant, and/or fragrance to the mulch of the present invention.

It is an object of the present invention for the mulch to further comprise NPK fortifiers. The fortified mulch can be made of paper fibers. This paper is placed in a mixer where NPK fortifiers and a binding agent, such as water, is added.

In one embodiment, the mulch of the present invention is made through an agitative agglomeration/granulation process. A moist paper fiber based product can be impregnated with NPK (nitrogen, phosphorous, potassium) fortifiers in a mixer. The paper product is combined with the NPK fortifiers either before, or after entry into a mixer. The mixer performs work that results in an agglomerated (or granulated) product that is a homogeneous blend of the paper product and NPK fortifiers. Dyes can be added to the mulch by homogeneously blending the colorant with the mulch. The mulch can be blended with the colorant either before or at an agglomeration step. The dye can also be surface applied (wet or dry) after the agglomeration step.

A binding agent can be added at the mixer to enhance the agglomeration/granulation process. In an embodiment, the dyes or fragrances can be applied to the mulch along with or mixed with binders in the same agglomeration step. To increase the percent of on-sized product, a size reduction operation can be performed on the paper fiber product prior to entry into the mixer.

It is an object of the present invention to reduce segregation (unmixing) tendencies of blends of materials (including seeds). Segregation of materials can be influenced by many factors. They include:

Particle Size
Bulk density
Particle shape
Particle friction

It is an object of the present invention to provide an agglomerate that is a small enough size to resist segregation. It is an object of the present invention to provide an agglomerate that has a light bulk density. It is an object of the present invention to provide agglomerates that are asymmetrical and possess interlocking properties. It is an object of the present invention to provide an agglomerate that does not have a smooth surface.

These and other features and advantages of the preferred embodiment of the present invention will become apparent from the detailed description of the preferred embodiments.

DETAILED DESCRIPTION OF THE INVENTION

In a preferred embodiment, the agglomeration performed to create the agglomerates that comprise the mulch as a carrier product under the invention, is done by either a tumbling/agitation, (balling drum or pan, mixer, fluidized bed, and/or suspension methods), induration (shaft furnace, rotary kiln, and/or calciners methods), pressure (piston presses for tabletting, and/or roller presses for briquetting/compacting methods), or other agglomeration technology (heat, spray solidification, direct capillary action, and/or coating technique methods. Extrusion and/or pelleting methods of pressure agglomeration technology are a less preferred technique under the present invention.

In an embodiment, a paper fiber based product, which can be moist, can be impregnated with NPK fortifiers in a mixer. The mixer is preferably a pin mixer, but can also be a pan pelletizer, paddle mixer, drum granulator or other type of mixer. In an embodiment, the paper fiber based product is comprised of a byproduct of a paper making process. Sewage sludge can be used to create the fortified mulch rather than or in addition to paper fibers.

Below is an example of how the carrier mulch can be agglomerated with an agitation/tumble technology using a mixer (pin) as the method.

EXAMPLE

Pin Mixer

In a pin mixer, agglomeration occurs when radially extended pins mounted on a high velocity central rotor shaft in a stationary cylindrical shell impart agitation forces on the material and sprayed liquid binder. This causes a tumbling, turbulent movement resulting in densification.

It was concluded that varying the speed (RPM) effected the pellet size. Increasing the speed caused a decrease in particle size. It was found that the pin mixer when set at 650 RPM resulted in a product that consisted largely of end-size (−6,+16) product.

Paper was added to the mixer. 36-lbs./hr water was metered into the pin mixer. The percent moisture in the paper was 52.3% water. The NPK fortifiers were added to the pin at a rate of 28 lbs./hr.

In a preferred embodiment, the agglomerate of the present invention has the following characteristics:

Agglomerates have a lighter bulk density (16–30 lbs/cu.ft.)

Agglomerates are asymmetrical and possess interlocking properties (i.e., they are irregular in shape and contain "hook-type" projections). The less the mulch is agglomerated, the more interlocking it becomes.

Agglomerates are not smooth and therefore have a higher level of particle friction between agglomerates, causing them to interlock more. Agglomerates vary slightly in size.

Mulch Advantage as a Carrier

When the mulch is packaged, or mixed with seeds, the seeds are prone to stay suspended throughout the carrier of the present invention (i.e. not prone to segregation). The composition of the present invention flows freely through various spreaders and spreader types, including conventional spreaders. Therefore, when being applied, the mulch acts as a delivery system for the seeds. The composition of the present invention acts as an indicator for the individual applying the seed as the mulch can be visibly seen. The composition of the present invention does not easily roll or wash away on the ground after application easily because of the non-circular shapes. The composition of the present invention eliminates confusing seed/mulch/fertilizer blending ratios.

While the invention has been particularly shown and described with reference to the preferred embodiment of the present invention, it will be understood by those skilled in the art that the foregoing and other changes in form may be made therein without departing from the spirit and scope of the invention.

What is claimed is:

1. A mulch product, comprised of mulch agglomerates wherein
    said mulch agglomerates are produced by an agglomeration process;
    said agglomeration process uses a tumble/agitative agglomeration technology;
    wherein the mulch product is a carrier for seeds;
    said seeds staying suspended substantially uniformly throughout said carrier while in a package.

2. The mulch product of claim 1 wherein said tumble/agitative agglomeration technology uses either a mixer, balling drum/pan, and/or fluidized bed method.

3. The mulch product of claim 2 wherein said mixer is of a double cone, twin shell turbine, drum ribbon, vertical screw in cone, paddle, plow countercurrent, pin, multiple cone, vertical plow, falling curtain drum and/or muller.

4. The mulch product of claim 1 wherein said mulch comprises;
    a material comprising a fiber cellulose, clay, loam, sand, and/or a combination of same.

5. The mulch product of claim 4 further comprising;
    a binding agent.

6. The mulch product of claim 1 further comprising;
    macronutrients and/or micronutrients.

7. The mulch product of claim 1 further comprising;
    a binding agent.

8. The mulch product of claim 1 further comprising;
    a colorant.

9. A mulch product, comprised of mulch agglomerates wherein said mulch agglomerates are produced by an agglomeration process;
    said agglomeration process uses indurance technology;
    wherein the mulch product is a carrier for seeds;
    wherein said agglomerates possess interlocking properties consisting of said mulch product having hook-type projections;
    said seeds staying suspended substantially uniformly throughout said carrier while in a package.

10. The mulch product of claim 9 wherein said mulch comprises;
    a material comprising a fiber cellulose, clay, loam, sand, and/or a combination of same.

11. The mulch product of claim 9 further comprising a binding agent.

12. A mulch product, comprised of mulch agglomerates wherein said mulch agglomerates are produced by an agglomeration process;
    said agglomeration process uses agglomeration by heat, spray solidification, direct capillary action and/or coating techniques;
    wherein the mulch product is a carrier for seeds;
    wherein said agglomerates possess interlocking properties consisting of said mulch product having hook-type projections;
    said seeds staying suspended substantially uniformly throughout said carrier while in a package.

13. The mulch product of claim 12 wherein said mulch comprises;
    a material comprising a fiber cellulose, clay, loam, sand, and/or a combination of same.

14. The mulch product of claim 12 further comprising a binding agent.

15. A mulch product comprising agglomerates produced by an agglomeration process wherein said agglomerates:
    are small enough to resist segregation; and
    are asymmetrical and possess interlocking properties;
    said interlocking properties consisting of said mulch product having hook-type projections;
    said mulch product is a carrier for seeds;
    said agglomerates keening seeds suspended substantially uniformly throughout said carrier while in a package.

16. The mulch product of claim 15 wherein said agglomerates have a non-smooth surface and a high level of particle friction.

17. The mulch product of claim 15 wherein said agglomerates possess a bulk density of about 16–30 lbs/cu.ft.

18. The mulch product of claim 15 wherein said mulch comprises;
    a material comprising a fiber cellulose, loam, sand, and/or a combination of same.

19. The mulch product of claim 15 wherein said agglomerates can flow freely through conventional spreaders.

* * * * *